Jan. 10, 1950                  L. DE MOSS                  2,494,138
SKINNING MACHINE AND METHOD
Filed May 31, 1946                                2 Sheets-Sheet 1
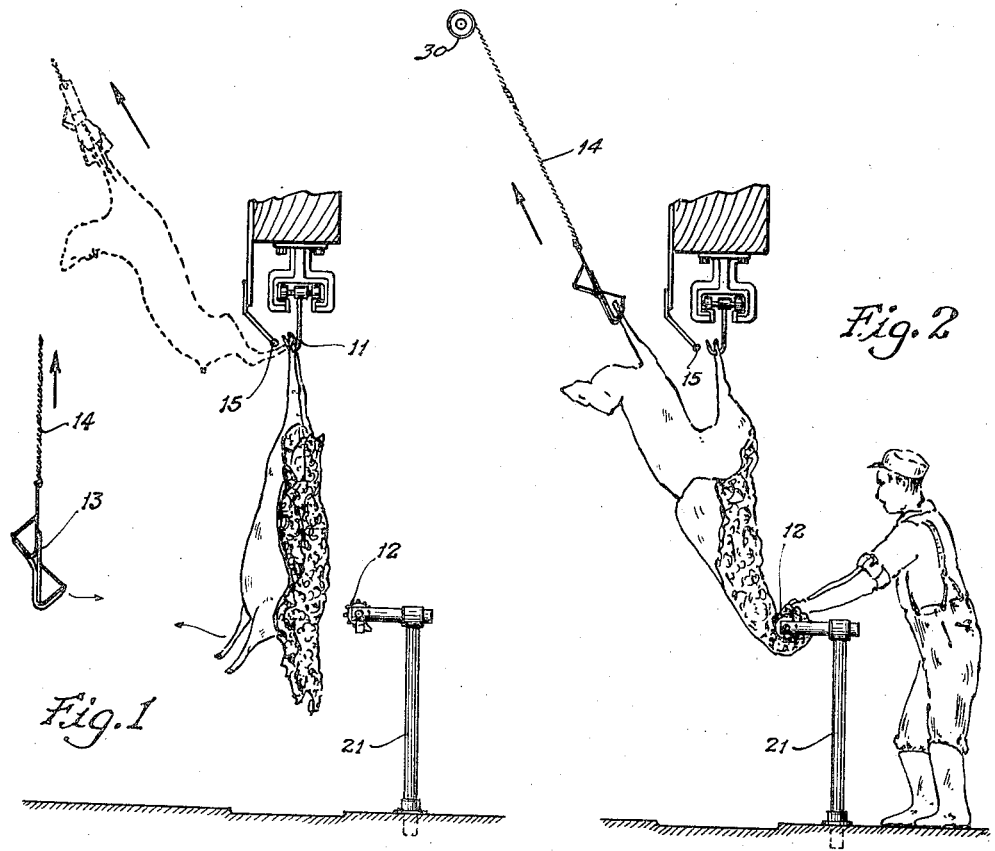
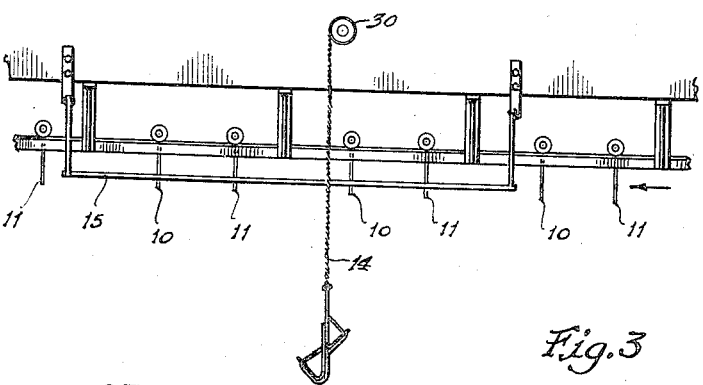
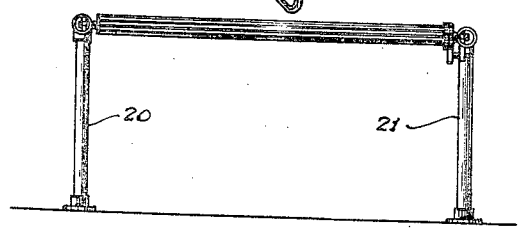
INVENTOR.
Leonard De Moss
BY
R. G. Story
ATTORNEY Jan. 10, 1950     L. DE MOSS     2,494,138
SKINNING MACHINE AND METHOD
Filed May 31, 1946     2 Sheets—Sheet 2

INVENTOR.
Leonard De Moss
BY R. G. Story
ATTORNEY

Patented Jan. 10, 1950

2,494,138

UNITED STATES PATENT OFFICE 2,494,138

SKINNING MACHINE AND METHOD

Leonard De Moss, Des Moines, Iowa, assignor to Swift & Company, Chicago, Ill., a corporation of Illinois Application May 31, 1946, Serial No. 673,520

9 Claims. (Cl. 17—21)

This invention relates to the skinning of animal bodies and more particularly to a method and apparatus for removing the pelt from a carcass.

It is an object of this invention to provide an improved skinning method adapted for power operation in the removal of pelts from the bodies of animals.

It is another object of this invention to provide an apparatus that may be used for more rapidly removing pelts from the bodies of animals.

A further object of the invention is to provide a method and apparatus for performing the skinning of the back and rump portions of a sheep or the like.

An additional object is to provide a means for completing the skinning of the body of a sheep by rapidly pulling the pelt from the carcass starting at the neck and working back over the rump.

Other objects will appear from the specification below.

In the drawings:

Figure 1 is a side elevation of a preferred form of an apparatus which may be used for performing the method of this invention.

Figure 2 is a side elevation, as in Figure 1, showing the pelt being stripped from a carcass.

Figure 3 is a front elevation of the apparatus shown in Figure 1.

Figure 4:
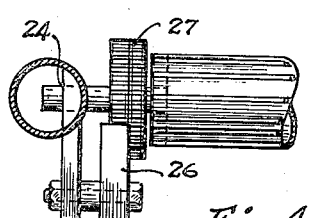
Figure 4 is a detail rear view, partly broken away, showing the means used for holding the free end of the pelt.

The usual procedure practiced in removing the skin from the body of an animal during the slaughtering process, is to cut the skin from the carcass manually, coupled with a manual pulling of the skin from certain areas of the carcass. The stripping operation is started at the top of the hind legs which are alternately used for suspending the body from the conveyor mechanism and the skin is stripped downwardly from the hind legs over the rump down the back toward the neck of the animal. The present day process requires the services of an expert workman since a considerable portion of the pelt is separated from the carcass by cutting. To speed the work, the knives are kept extremely sharp and any failure on the part of the skinner to properly direct the knife causes either the carcass or the skin to be scored, thus detracting from the value of the product.

In addition to the expert workmanship involved, a heavy effort must be exerted to manually pull the pelt from sections of the carcass such as the rump and back. As in cutting the pelt free, care must likewise be exercised in pulling the skin free in order to avoid stripping fat from the carcass along with the pelt.

Various proposals have been made to speed up the skinning process and to reduce the manual effort required to remove a skin, including the use of mechanical skinning knives. Mechanical devices of this latter type have been operated very successfully, but all means so far adopted for commercial practice entail considerable hand work and manual pulling. These mechanical devices simplify most of the cutting steps and minimize the possibility of damage to either the hide or the carcass, however, no successful method or means has yet been proposed as a substitute for the manual pulling step.

This invention is an improvement on known methods used for skinning and while certain hand cutting steps must still be performed, the invention here described provides power means for pulling the pelt from the main part of the carcass. The method and means here disclosed may have general utility but it has been found to be especially useful in the skinning of sheep.

The present invention may be used for skinning all animals having a layer of fell disposed between the body and the pelt. The method has particular usefulness in skinning sheep wherein the fell layer seems to have a characteristic grain structure. When stripping the pelt from a sheep carcass by pulling the pelt with the grain and particularly over the back and rump, the fell layer can be separated by mere pulling which permits the skin to be readily separated from the carcass. Pulling with the grain contemplates a pulling from the neck toward the rump and the following of this procedure enables the skin to be pulled free without stripping any of the underlying fat or meat tissue with the pelt. When the pelt is pulled from the carcass in the opposite direction, however, the fell pulls away with the pelt and some of the fat and sometimes muscle tissue pulls away from the carcass with the pelt.

In addition to taking advantage of the above-described characteristic of the fell layer of an animal during the skinning thereof, the body is manipulated in a particular manner to effect a stretching or tensioning of the surface of the carcass at the point where the skin is being separated. By suitably bending the carcass on itself, the outer surface of the bend becomes quite taut and it has been found that the pelt can be stripped more easily and satisfactorily therefrom by a mere pulling action as compared with pulling a pelt from a surface that is permitted to remain more or less flabby or baggy. This invention is concerned with a method and apparatus designed to utilize the fell layer and taut surface of a carcass during stripping of the pelt. A speeding up of the skinning operation is inherent in the performance of this invention as is also the production of a carcass having an improved appearance and the production of a pelt having fewer score marks and which is perforce more valuable.

Figure 8:
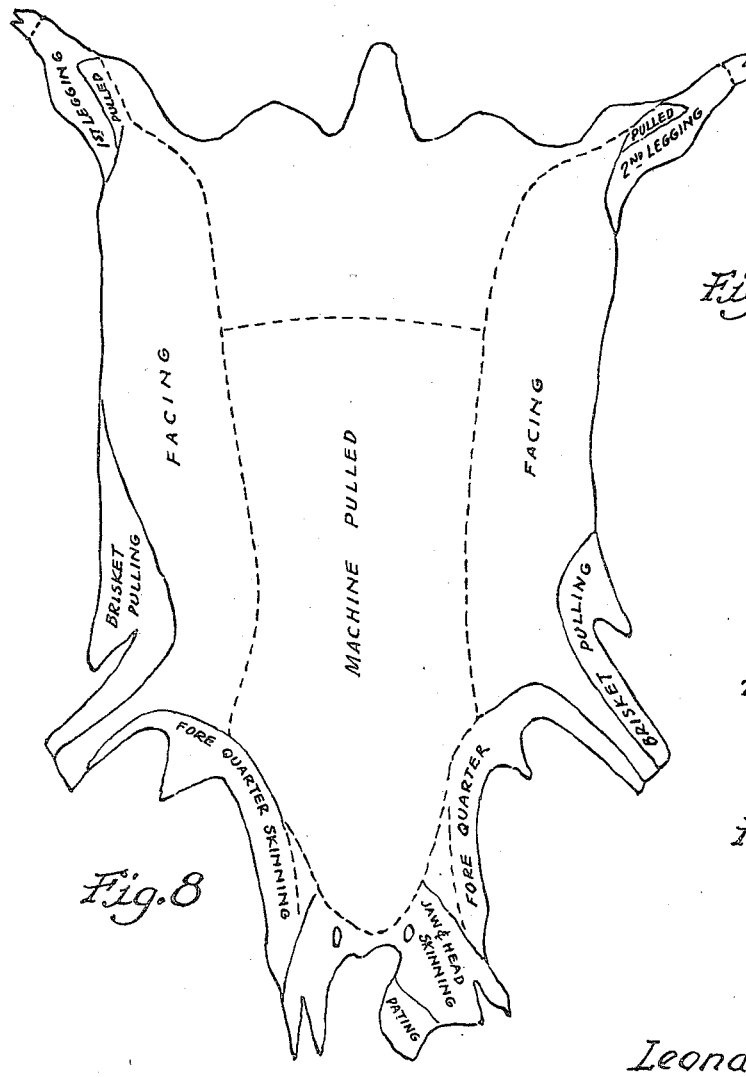
Figure 8 is a diagrammatic cutting pattern showing the successive steps followed in removing a skin or pelt from a carcass as here taught.

Preliminary to performance of the steps of this invention, the pelt is cut away partially from the rear legs, the front legs, and the underside of the carcass. Referring to Figure 8, it will be seen that a part of the pelt is initially cut from the carcass by hand. Immediately after the animal has been killed and bled, the body is hung from a conveyor system by its left hind leg. As the conveyor carries the carcass along, the pelt covering the skull is separated at the "pating" operation. Then as the body progresses along the conveyor, the right hind leg is first treated and the pelt is cut away from the leg throughout the area indicated approximately in Figure 8 as "1st legging."

After the skinning of the right hind leg has been accomplished, the carcass is hung from the right hind leg and the left hind leg is skinned. This skinning step is indicated in the chart of Figure 8 as "2nd legging" operation. The body is then hung by both hind legs and as the conveyor system carries it along, the forequartering operation is performed. At this stage the pelt is opened up along the breast of the body down to the chin and the skin is cut away from the carcass throughout the section indicated in Figure 8 as the "forequarter."

The pelt is next cleared from a portion of the front legs and brisket by opening the pelt from the breast back toward the navel. The pelt is separated from the carcass by manual pulling and cutting.

"Facing" is then performed and this operation includes loosening the skin around the underside of the belly of the body and up over the sides. It also includes completion of the stripping of the pelt from the front legs. The skin is first opened from the navel across the belly of the body to the tail and then the skin is cut from the belly of the carcass over to the point where the red meat along the sides begins to show. After the skin has been cut away over this area, the skinner shoves his fist into the opening between the carcass and the skin, and in completing the "fisting" or "facing" operation, the skin is separated from the carcass over to the area of the sides. The skin is also separated from the front leg by cutting and a small area along each of the back legs is pulled free during the "facing."

The final step in the preparation of the pelt for pulling includes the clearing of the skin from the jaw area, past the ears, and across the crown of the skull up to the neck area of the carcass, see Figure 8. This "jaw and head skinning" is performed with a knife.

Upon completion of the clearing of the pelt from the underside and legs of the carcass, the conveyor carries the body to the machine pulling device by means of which the removal of the pelt from the carcass is completed. In using this machine, the skin loosened from the head and forelegs of the animal is gathered around a suitable holding means and the forelegs of the animal are lifted so that the skin is progressively pulled from the carcass, beginning at the neck and working down over the back, and it is finally pulled loose from the rump, hind legs, and tail of the carcass.

As shown in the drawings, the partially skinned body is carried by a conveyor past a pelt holding means, the body being suspended from its hind legs from a pair of hooks, 10 and 11, of the conveyor. The carcass hangs free and the conveyor delivers the body to the holding means 12 formed of a horizontal bar element, in such position that the bar is disposed about shoulder height with respect to the body. Referring to Figure 2, it will be seen that the operator stands to one side of the horizontal bar 12 while the body passes down the other side and the operator reaches under the bar, grabs the skin loosened from the forelegs and head of the animal, and wraps the loosened head and foreleg skin around the bar 12.

Figure 6:
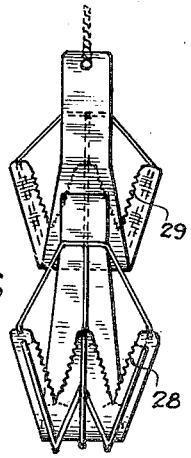
Figure 6 is a detail front elevation of a hook means for engaging the forelegs of the body being skinned.
Figure 7:
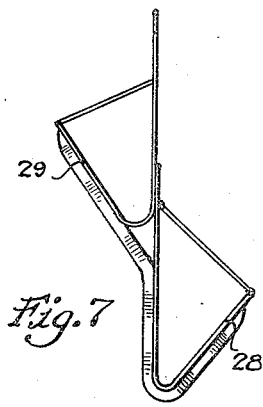
Figure 7 is a side elevation of the hook means shown in Figure 6.

While the operator shown in Figure 2 is wrapping the skin around the horizontal bar, hook means 13, such as are shown in Figures 6 and 7, are fixed to the forelegs of the carcass. The hook means 13 is fixedly secured to a suitable lifting device through a flexible cable 14 and, as shown in the dotted line position of Figure 1 and in Figure 2, the fore end of the carcass is lifted while the hind legs turn about the hooks 10 and 11 of the conveyor. Thus, as soon as the skin is firmly engaged on the horizontal bar, the forelegs are pulled upwardly and, due to the fixing of the pelt around the bar 12 coupled with the heavy tearing force required to pull the pelt free, the carcass is caused to bend into a sharp U shape, the bottom of the U moving across the back and rump of the carcass as the skin is pulled from it. The skin is progressively pulled from the carcass as the forelegs are lifted higher and higher and the skin separates from the carcass along a line at the bottom of the curvature of the U.

To complete the pulling of the pelt from the carcass, it is necessary that the body be lifted to substantially the dotted line position shown in Figure 1. In order to prevent the hind legs from being twisted free from hooks 10 and 11 a suitable guard 15 may be fixedly mounted in front of the open ends of the hooks so that the hind legs are positively trapped on the hooks.

It is to be noted that the lifting accomplished by picking the body up by the forelegs serves not only to provide the necesary motion to cause the pelt to be pulled from the carcass, but also to tension the surface of the carcass at the point where the pelt is being separated. As above explained, when the surface of the carcass is drawn taut, the fell layer tears to free the skin whereas otherwise the muscle tissues are sometimes torn off with the skin when the flesh is flabby or baggy.

By reason of the fact that the body is lifted by the forelegs to pull the pelt as here described, the shoulders of the body are stretched around the chest bones to draw the surface of the neck and shoulders taut. The surface of back and rump is tensioned progressively at the point where the skin is being separated since it falls on the outside of the curve of the U shape produced by doubling the carcass back upon itself.

After the pelt has been completely pulled from the carcass, the foreleg lifting hooks 13 are lowered and disengaged from the forelegs of the carcass. The skin separated from the carcass is disengaged from the horizontal bar and the apparatus is ready to receive the next succeeding body to be skinned.

Figure 5:
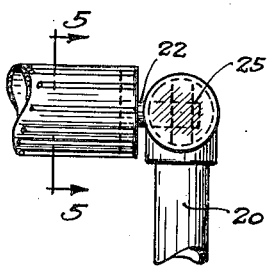
Figure 5 is a cross section of the holding means taken on line 5—5 of Figure 4.

The pelt holding means may take any form which will serve to hold the loosened pelt fixed while the remainder is being pulled free. The simplest form of a device for doing this is the horizontal bar 12 shown in the drawings which preferably takes the form of a corrugated roller, like that shown in Figures 4 and 5. The corrugations provide a roughened surface to aid the operator in holding the pelt against the pull of the lift means, the bar being carried in standards 20 and 21 in such position as to be approximately shoulder high with respect to the animals flowing down the conveyor line. The bar is mounted for rotation in one direction so that any slack which may occur during the pelt pulling operation may be immediately taken up by the operator exerting a pull on the pelt. For this purpose, the bar 12 is carried on a shaft 22 which is mounted in bearings 24 and 25 rigidly fixed to the upper ends of the standards. To control the rotation of the horizontal bar, a suitable ratchet pawl 26 is pivotally mounted on standard 21 to cooperate with a ratchet wheel 27 fixed to the horizontal bar. The ratchet mechanism is so arranged as to permit the horizontal bar to rotate in a counterclockwise direction with respect to Figures 1 and 2. The ratchet, of course, is set during a pelt pulling operation to prevent the horizontal bar from rotating backwards so as to lessen the pulling action.

The form of hook 13 shown in Figures 6 and 7 provides means disposed at different levels for handling animals of different size. The lower hooks 28 as shown in Figures 6 and 7 are provided to engage the forelegs of the shorter animals. Hooks 29 are adapted to engage the forelegs of longer animals so that a sufficient length of travel is provided during the lifting of longer animals to complete the pulling of the pelts. By providing the two hooks as shown in the preferred form of the device here described, a single lifting mechanism having a fixed length of travel may be used.

The lifting means should be power driven for speed and any convenient source of power may be utilized. The requirements for the lifting means are limited only as to speed, length of travel for the hook 13 and power. These are all practical considerations and no critical relationships seem to be involved.

Automatic stopping means may be provided, and once the pulling action has started, lifting will take place until the pelt is pulled free. Immediately thereafter the automatic means may be made operative to discontinue the lifting. The device also may be arranged as desired to automatically lower the animal or wait the operator's attention to cause the lowering. Any suitable means may be provided to initiate the lifting action.

By way of example, any conventional electric powered lifting means (not shown) may be used wherein a reversible motor is connected through a speed reducing mechanism to the pulley 30. The motor can be energized by manually pressing a switch when the necessary manipulations have been performed to ready the carcass for skinning, and either manual control or automatic control is established as suggested above. The pulley 30 is first driven to wind up the flexible cable 14 to lift the carcass by its forelegs, and after the skinning has been completed, the drive motor is reversed so that the pulley is driven to unwind the cable whereby to drop the hook means 13 so that the skinned carcass way be released therefrom and removed from the skinning station.

As above stated, this method and apparatus has been found to be particularly useful for the skinning of sheep. The structure of the bodies of sheep and lambs is such that advantage may be taken of a layer of fell between the skin and the carcass, which permits the easy separation of the skin from the carcass when pulling from the neck toward the rump. The grain structure of the fell layer permits stripping in this direction with the result that the fell remains on the back and rump area and serves as a protective sheeting for the carcass during subsequent handling. Upon exposure to the atmosphere, the fell layer dries out, forming a tough white covering for the carcass so that not only is it protected by this hardened fell layer, but also the appearance of the dressed carcass is improved.

The device, however, may be used for pulling the pelts from animal bodies in general and has been found to be quite satisfactory for use in the skinning of calves. The operation is not quite so satisfactory in this instance, however, since it sometimes happens that fat is pulled from the carcass of a calf along with the pelt. If this is not an important consideration, the device is completely operative to complete the separation of the pelt from the veal carcass.

The above description covers the preferred mode of operation and form of apparatus which may be used in performing this invention. It is apparent that equivalent structures will occur to those skilled in the art, and it is intended that the above description shall not be considered a limitation but that all such modifications shall fall within the scope of the following claims.

I claim:

1. A method for completing the removal of a pelt from the body of a sheep or the like, comprising suspending the body from the hind legs thereof, holding the neck portion of a pelt that has previously been loosened from the underside and forelegs of the body, and then lifting the forelegs of the body to relatively pull the pelt from the body, said lifting action serving to draw taut the surface of the back and rump of the carcass at the point where the pelt is being separated from the carcass.

2. A method for completing the removal of a pelt from the body of a sheep or the like, comprising suspending the body from means engaging the hind legs thereof, holding the neck portion of a pelt on means engaging that portion of the pelt which has previously been loosened from the underside and forelegs of the body, maintaining the suspending means and the holding means in relatively fixed positions with the holding means about shoulder high to the suspended body, and then lifting the forelegs of the body to relatively pull the pelt from the body, said lifting action serving to bend the body into a relatively sharp U shape to draw taut the surface of the back and rump of the carcass at the point where the pelt is being separated from the carcass.

3. A method for completing the removal of a pelt from the body of a sheep or the like, comprising holding the forelegs and hind legs of the body closely together, holding a portion of the pelt that has previously been loosened from the underside and forelegs of the body, relatively pulling the pelt away from the legs to force the body into a U shape, and separating the pelt from the carcass along a line generally tangent to the taut surface of the carcass at the bottom of the U.

4. A method for completing the removal of a pelt from a body, such as sheep and the like, said pelt having been manually loosened from the legs and underside of the carcass, comprising holding the body by the hind legs, drawing the loosened pelt adjacent the neck portion of the body around a fixed means, and then pulling the carcass from the pelt by doubling the carcass back upon itself, whereby the surface of the back and rump of the carcass is tensioned adjacent the point of separation between the carcass and the pelt as the pelt is pulled free.

5. A method for completing the removal of a pelt from the body of a sheep or the like, said pelt having been manually loosened from the legs and underside of the carcass, comprising suspending the body from its hind legs, drawing the loosened pelt adjacent the neck portion of the body around a fixed means, and then pulling the carcass upwardly beginning from the neck end to double the carcass back upon itself, said pulling action serving to separate the pelt from the carcass while drawing the surface of the back and rump taut adjacent the successive points of separation of the pelt from the carcass.

6. A method for completing the removal of a pelt from the body of a sheep or the like, said pelt having been manually loosened from the legs and underside of the carcass, comprising suspending the body from its hind legs, drawing the loosened pelt adjacent the neck portion of the body around a fixed means, and then pulling the front end of the carcass upwardly by the forelegs to double the carcass back upon itself, said pulling action serving to separate the pelt from the carcass, beginning at the neck and working toward the rump, while drawing the surface of the back and rump taut adjacent the successive points of separation of the pelt from the carcass.

7. An apparatus for completing the removal of a pelt from the body of a sheep or the like, comprising means from which to suspend the body by its hind legs, means to hold the neck portion of a pelt that has previously been loosened from the underside and forelegs of the carcass, and means to lift the forelegs of the body to double the carcass back upon itself, said lifting serving to pull the carcass away from the pelt while simultaneously drawing the surface of the back and rump taut while separating the pelt therefrom.

8. An apparatus for completing the removal of a pelt from the body of a sheep or the like, comprising means from which to suspend the body by its hind legs, means to hold the neck portion of a pelt that has previously been loosened from the underside and forelegs of the carcass, and means to lift the forelegs of the body to double the carcass back upon itself, said suspending and lifting means being positioned side by side to cause the carcass to assume a generally U shape, and said holding means being so disposed as to cause the pelt to separate from the carcass along a line generally tangent to the taut surface of the carcass at the bottom of the U.

9. An apparatus for completing the removal of a pelt from the body of a sheep or the like, comprising means to hold the hind legs of the body, means to hold the neck portion of a pelt that has previously been loosened from the underside and forelegs of the carcass, said pelt holding means being spaced from the said hind leg holding means such that the body is disposed in a generally straight line, and means to engage and draw the forelegs of the body toward the hind leg holding means, whereby the pelt is separated from the carcass while the surface of the carcass along the back and rump is drawn taut at the point where the skin is being separated.

LEONARD DE MOSS.

REFERENCES CITED

The following references are of record in the file of this patent:

UNITED STATES PATENTS

| Number | Name | Date |
| --- | --- | --- |
| 63,910 | Lewis | Apr. 16, 1867 |
| 76,642 | Lull | Apr. 14, 1868 |